US009927955B2

(12) United States Patent
Keller et al.

(10) Patent No.: US 9,927,955 B2
(45) Date of Patent: Mar. 27, 2018

(54) GENERATING A CONFIGURATION PAGE FOR RENDERING IN A GRAPHICAL USER INTERFACE (GUI) FOR MANAGING PROVISIONING OF STORAGE RESOURCES IN A STORAGE SYSTEM

(71) Applicant: International Business Machines Corporation, Armonk, NY (US)

(72) Inventors: Michael Keller, Haifa (IL); Ofer Leneman, Kfar Saba (IL); Yoni Raveh, Modin (IL); Gal Sinay, Tel-Aviv (IL); Moshe Weiss, Petah Tikvah (IL)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 14/937,569

(22) Filed: Nov. 10, 2015

(65) Prior Publication Data

US 2017/0131853 A1 May 11, 2017

(51) Int. Cl.
*G06F 3/0482* (2013.01)
*G06F 3/0484* (2013.01)
*G06F 3/14* (2006.01)

(52) U.S. Cl.
CPC ........ *G06F 3/0482* (2013.01); *G06F 3/04842* (2013.01); *G06F 3/04847* (2013.01); *G06F 3/14* (2013.01)

(58) Field of Classification Search
None
See application file for complete search history.

(56) References Cited

U.S. PATENT DOCUMENTS

| 7,725,506 B1 * | 5/2010 | Stringham ........ G06F 17/30135 707/822 |
| 8,504,710 B2 | 8/2013 | Fallon |
| 8,918,605 B2 | 12/2014 | Aronovich et al. |
| 2007/0220316 A1 | 9/2007 | Guha et al. |

(Continued)

OTHER PUBLICATIONS

Google, "It's Happening Now: This the Tera Era", dated Jul. 2008, HGST—a Western Digital company, Total 10 pages.

(Continued)

*Primary Examiner* — Tuan S Nguyen
(74) *Attorney, Agent, or Firm* — David W. Victor; Konrad, Raynes, Davda & Victor, LLP

(57) ABSTRACT

Provided are a computer program product, system, and method for generating a configuration page for rendering in a graphical user interface (GUI) for managing provisioning of storage resources in a storage system. A determination is made of allocation commitment certainties for virtual storage ranges to allocate from the storage system based on physical capacity in the storage system and an estimated data reduction rate. Each of the allocation commitment certainties indicates a likelihood that a corresponding of the virtual storage ranges will be available for allocation in the storage system. Visual representation of a plurality of user selectable storage spaces indicating the allocation commitment certainties for the virtual storage ranges in the user selectable storage spaces are rendered in the configuration page. A user selection graphic that when selected provisions a selected of the user selectable storage spaces in the storage system is rendered in the configuration page.

20 Claims, 12 Drawing Sheets

(56) References Cited

U.S. PATENT DOCUMENTS

| | | | | |
|---|---|---|---|---|
| 2009/0157956 A1* | 6/2009 | Kano | ............... | G06F 3/0608 |
| | | | | 711/112 |
| 2009/0276588 A1* | 11/2009 | Murase | ............... | G06F 3/0608 |
| | | | | 711/160 |
| 2014/0052699 A1* | 2/2014 | Harnik | ............... | G06F 3/0605 |
| | | | | 707/692 |
| 2015/0056578 A1 | 2/2015 | Olenick et al. | | |

OTHER PUBLICATIONS

Norvag, K. et al., "Log-Only Temporal Object Storage", dated 1997, Department of Computer and Information Science, Total 6 pages.

"A Method and System for Maximizing Storage Efficiency in a Device with Limited Storage Capacity", dated Apr. 8, 2014, an IP.com Prior Art Database Technical Disclosure, IP.com No. 000236140, Total 5 pages.

IBM, "(PF/RdChannel#17/PM) Programmable Hard Disk Storage Offering Increased Capacity and/or Performance for Multimedia Applications" dated Dec. 1, 2001, an IP.com Prior Art Database Technical Disclosure, IP.com No. 000014975. Total 6 pages.

* cited by examiner

GENERATING A CONFIGURATION PAGE FOR RENDERING IN A GRAPHICAL USER INTERFACE (GUI) FOR MANAGING PROVISIONING OF STORAGE RESOURCES IN A STORAGE SYSTEM

BACKGROUND OF THE INVENTION

1. Field of the Invention

The present invention relates to a computer program product, system, and method for generating a configuration page for rendering in a graphical user interface (GUI) for managing provisioning of storage resources in a storage system.

2. Description of the Related Art

In virtual storage systems that allow for the provisioning of virtual storage space exceeding the physical space in the storage system, the amount of available virtual allocable space may be a function of the available physical. In a thinly provisioned system, more storage space than available may be provisioned to users and the storage space is only allocated or assigned when actually used. In a thick provisioned system, the virtual storage space is the same as the physical storage space. In thinly provisioned systems, the administrator assigns virtual storage space exceeding the physical space with the expectation users will not fully utilize their allocation. This requires the storage administrator to maintain information on optimal ratios of virtual to physical storage and make determinations on whether the amount of virtual space needs to be adjusted upward or downward based on workload at the system.

There is a need in the art for improved techniques for providing information on storage space for use by an administrator when provisioning virtual storage space.

SUMMARY

Provided are a computer program product, system, and method for generating a configuration page for rendering in a graphical user interface (GUI) for managing provisioning of storage resources in a storage system. A determination is made of allocation commitment certainties for virtual storage ranges to allocate from the storage system based on physical capacity in the storage system and an estimated data reduction rate. Each of the allocation commitment certainties indicates a likelihood that a corresponding of the virtual storage ranges will be available for allocation beyond the physical capacity of the storage system. Visual representation of a plurality of user selectable storage spaces indicating the allocation commitment certainties for the virtual storage ranges in the user selectable storage spaces are rendered in the configuration page. At least one of the user selectable storage spaces includes the virtual storage ranges. A user selection graphic that when selected provisions a selected of the user selectable storage spaces in the storage system is rendered in the configuration page.

DETAILED DESCRIPTION

When introducing data reduction into a storage system, such as through deduplication or compression, a suitable size for virtual storage to provision may vary based on the data reduction rates. The data reduction rates can vary over time and effect usable underlying virtual storage capacity. For instance, as data reduction rates increase, i.e., the compression or deduplication ratio increases, then the amount of virtual storage used may be increased because data storage may consume less of the physical storage. If the data reduction rate decreases, then this may reduce the virtual storage space that can safely be allocated with an expectation the physical space will be available when needed.

Described embodiments provide techniques for determining allocation commitment certainties for virtual storage ranges that may be configured in user storage spaces in a storage system. Allocation commitment certainties are determined for virtual storage ranges to allocate from the storage system based on physical capacity in the storage system and an estimated data reduction rate. Each of the allocation commitment certainties indicates a likelihood that a corresponding of the virtual storage ranges will be available for allocation beyond the physical capacity of the storage system. A configuration page renders a visual representation of a plurality of user selectable storage spaces indicating the allocation commitment certainties for the virtual storage ranges in the user selectable storage spaces. In this way, the user is provided the certainty levels of different virtual storage ranges in the storage space options when deciding to select a storage space to provision.

Figure 1:
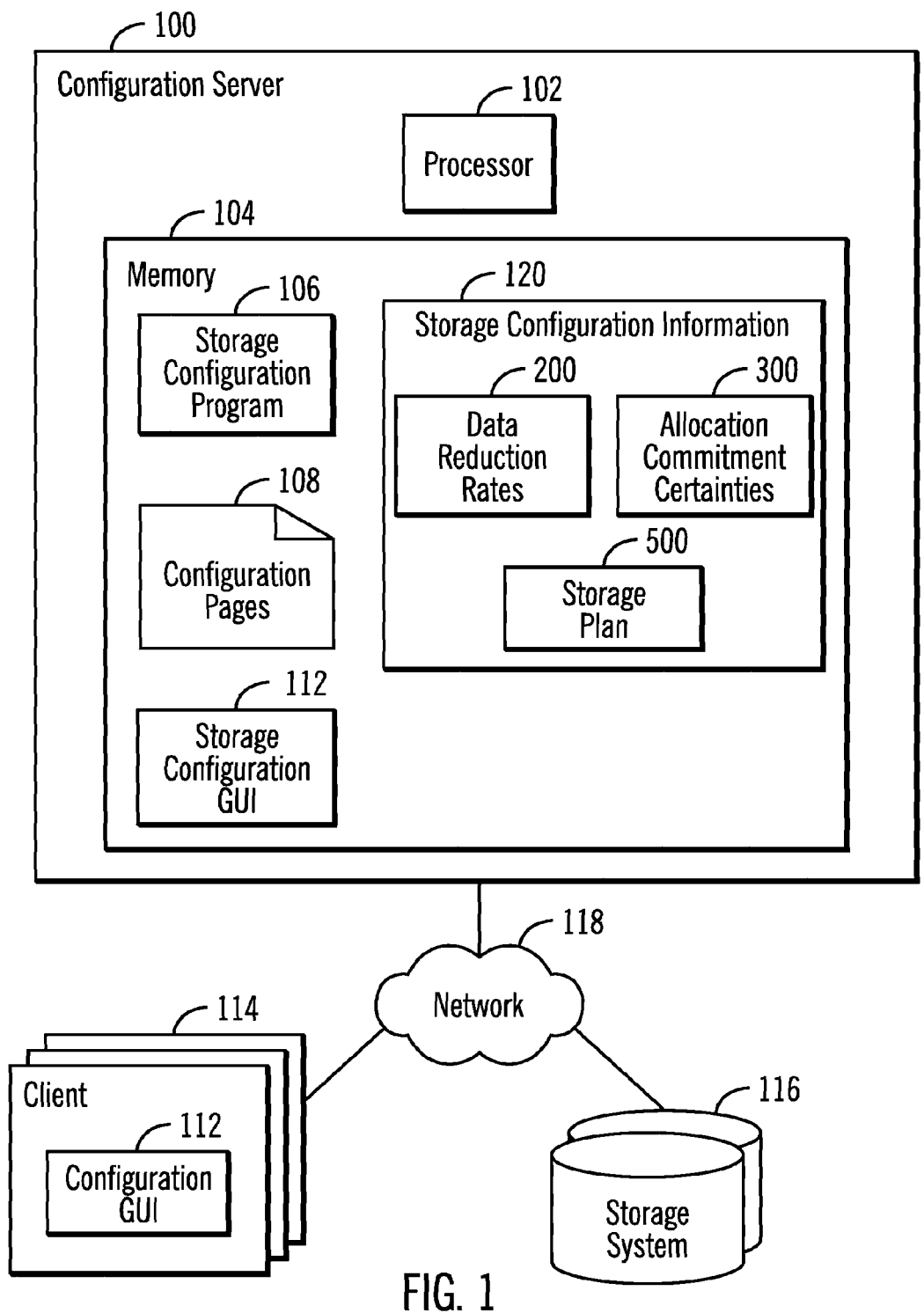
FIG. 1 illustrates an embodiment of a configuration computing environment.

FIG. 1 illustrates an embodiment of a computing environment including a configuration server 100 having a processor 102 and a main memory 104 including a storage configuration manager program 106 for generating configuration pages 108 of user interface controls to render in a configuration graphical user interface (GUI) 112 running in client systems 114 and the server 100 to configure one or more storage systems 116 and provision storage in the storage systems 116 to users. The configuration page 108 includes user interface controls to configure the storage systems 116 over a network 118. The storage configuration manager 106 may also generate configuration pages 108 to configure storage systems 116 in and directly connected to the clients 114 and the system 100.

The storage configuration manager 106 generates the configuration pages 108 from information maintained in storage configuration information 120 including data reduction rates 200 providing information on benchmark and compression and deduplication rates experienced in a storage system 116; allocation commitment certainties 300 providing certainties that ranges of virtual storage in one of the storage systems 116 will be available for commitment to an allocation; and one or more storage plans 400 providing information on storage provisioned to users, such as a host, volume, etc. The configuration server 100 may transmit the configuration pages 108 to the client systems 114 over the network 114 to render in their configuration GUIs 112 to allow the storage systems 116 to be configured from different clients 114 and the server 100.

To render the storage configuration user interface in the storage configuration GUI 112, the storage configuration manager 106 may generate configuration pages 108 having user interface controls and content loaded into the storage configuration GUI 112. The configuration pages 108 may be encoded using Hypertext Markup Language (HTML), Extended Markup Language (XML) and additional software frameworks, browser extensions, plugins, etc. that render graphics and other user interface components, such as ActiveX®, Adobe Flash®, JavaFX®, Java® Applets, JavaScript®, etc. (In many countries, ActiveX is a registered trademark of Microsoft Corporation; Adobe Flash is a registered trademark of Adobe Systems Inc.; and Java, JavaScript, and JavaFX are registered trademarks of Oracle America, Inc.) The storage configuration GUI 112 may comprise a program suitable for rendering configuration pages 108of user interface controls, such as a web browser or desktop application program. The storage configuration GUI 112 and the generated configuration pages 108 may be rendered on a display screen at the system 100 and clients 114, and input received through a user input device, such as a mouse, keyboard, voice activation, touch sensitive screen, etc.

When generating the user interface controls in the configuration pages 108, a new page may be generated or graphic changes may be rendered through a plugin, browser extension or other graphics delivery mechanisms generated within the current page 108 loaded in the storage configuration GUI 112.

The memory device 104 may comprise suitable devices known in the art for functioning as a main memory of a computer system, such as a Random Access Memory (RAM), Dynamic RAM (DRAM), Static DRAM (SDRAM), storage-class memory (SCM), Phase Change Memory (PCM), resistive random access memory (RRAM), spin transfer torque memory (STM-RAM), conductive bridging RAM (CBRAM), etc.

The storage system 116 to configure may be comprised of a storage controller and a storage medium. The storage system 116 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

Figure 2:
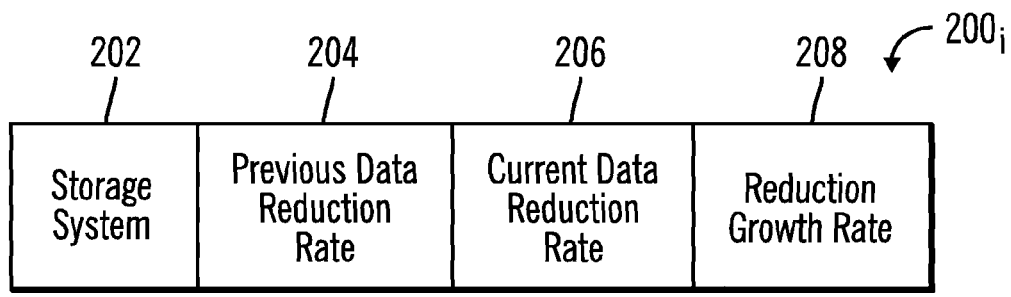
FIG. 2 illustrates an embodiment of reduction rates.

FIG. 2 illustrates an embodiment of an instance of data reduction rate information $200_i$, the storage configuration manager 106 maintains for a storage system 116, including a storage system identifier 202; a previous data reduction rate 204 comprising a previously determined deduplication and compression ratio for the data used to estimate the allocation commitment certainties; a current data reduction rate 206 measured since the last determined data reduction rate 204; and a reduction growth rate 206 indicating the positive or negative growth in the data reduction rate from the previous data reduction rate 204 to the current data reduction rate 206.

The storage system 116 may reduce data through the use of deduplication, which is a data reduction technique for eliminating redundant data to improve storage utilization. Deduplication reduces the required storage capacity because only one copy of a unique data unit, also known as a chunk, is stored. Data reduction rates for deduplication increase as the amount of data in storage increases because there are more chunks stored available to be duplicates of new data being added. The data reduction technique may also utilize other types of compression techniques or multiple compression and deduplication techniques in combination.

The current data reduction rate 206 and growth rate 208 may be set to an initial predetermined value provided by the data reduction program managing data reduction operations at the storage system 116. The storage configuration manager 106 may determine realized deduplication rates at a storage system 116 by interacting with a deduplication manager or system information to determine the data reduction rate being experienced, which is a rate of data units stored to physical storage units.

Figure 3:
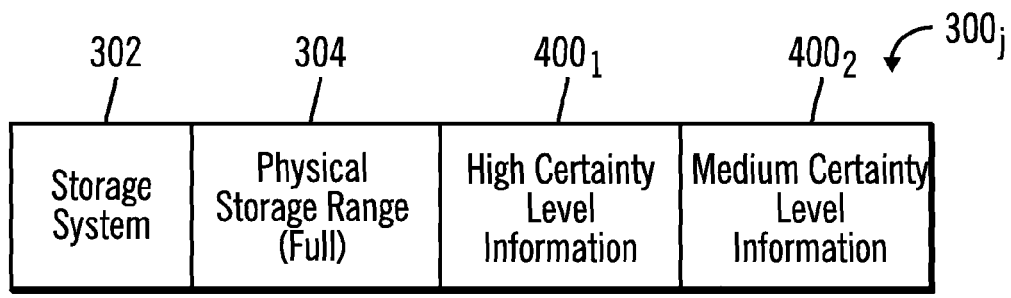
FIG. 3 illustrates an embodiment of allocation commitment certainties.

FIG. 3 illustrates an instance of allocation commitment certainties $300_i$ including a storage system 302 identifier indicating a storage system 116 to which the allocation commitment quantities apply; the physical storage 304 capacity indicating actual physical storage in the storage system 302 which corresponds to full certainty; and at least two certainty level information instances 400, for virtual storage ranges, including high certainty level information $400_1$ and medium certainty level information $400_2$.

Each certainty level information instance $400_i$, includes a certainty level 402 which may comprise a descriptor, e.g., high, medium, etc., indicating a likelihood that a virtual storage range will be available for commitment; a previous virtual storage range 404 comprising a previously determined virtual storage range having the certainty level 402; and a current virtual storage range 406 comprising a currently determined virtual storage range based on current data reduction rates having the certainty level 402.

Each of the virtual storage ranges for a given certainty level is calculated based on information related to a current or default data reduction rates, such as a current experienced data reduction rate in the storage system 302 or information based on the data reduction rate 206, such as a growth 208 (positive or negative) in the data reduction rate since the previous virtual storage range 404 was determined or other information related to compression and reduction trends in the system.

Although FIG. 3 shows just a high and medium certainty levels, indicating virtual storage ranges having a high and medium certainty of being available for allocation given current data reduction rates and trends, there may be additional certainty levels calculated from data reduction rate information.

Figure 5:
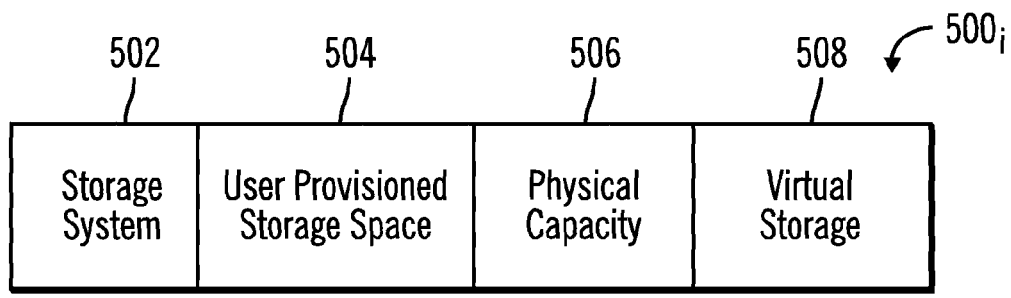
FIG. 5 illustrates embodiments of a storage plan comprising a user configured storage space.

FIG. 5 illustrates an embodiment of a storage plan instance $500_i$, configured in one of the storage systems 116 for a user, such as a host, volume, etc., and includes a storage system identifier (ID) 502 of the storage system 116 in which the storage is configured; a user provisioned storage space 504 configured from the storage system 502; a physical storage 506 and virtual storage 508 included in the user provisioned storage space 504.

Figure 6:
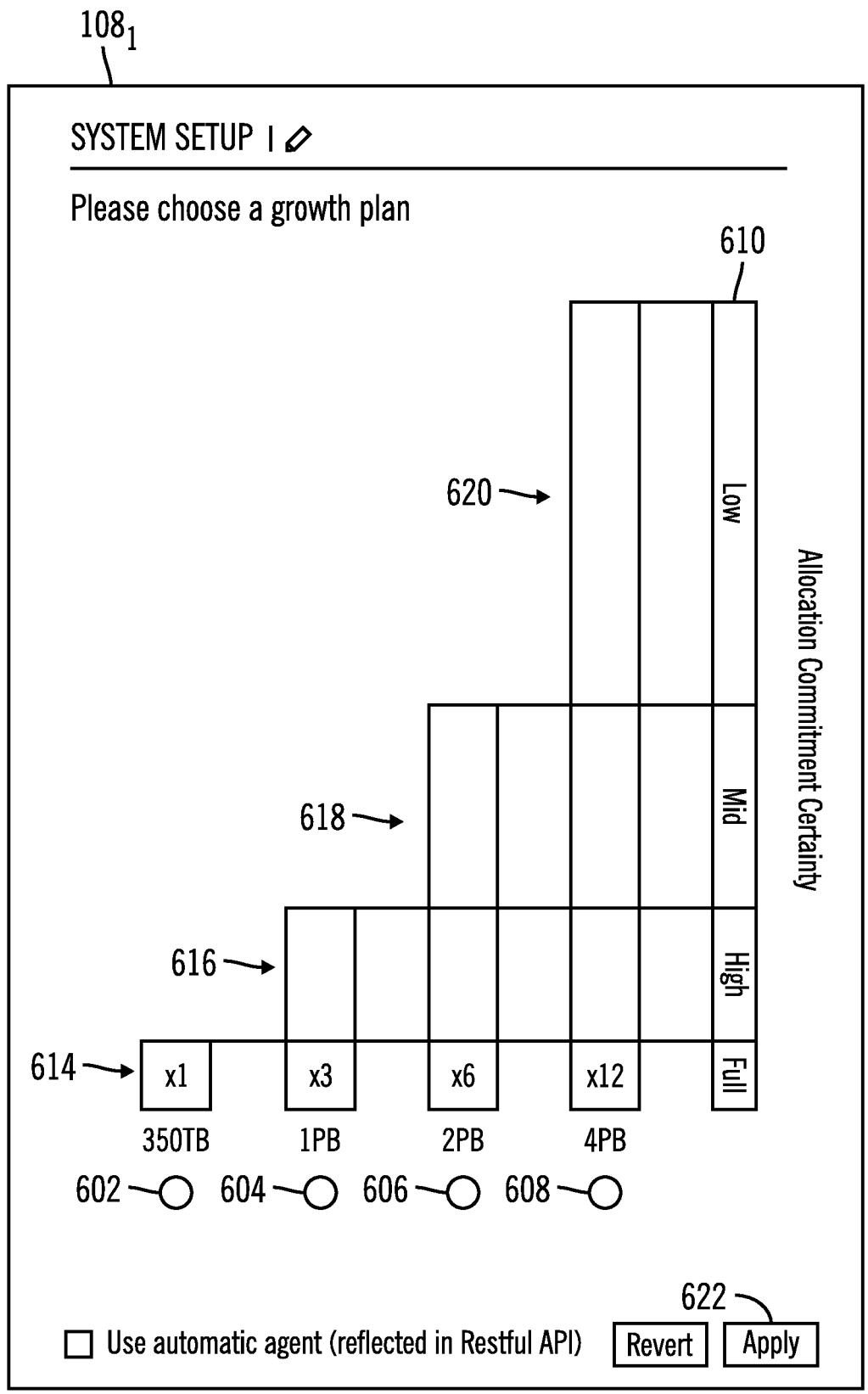
FIGS. 6, 7, 8, 9, and 10 illustrate embodiments of configuration pages rendered with allocation commitment certainties to select storage resources to provision.

FIGS. 6-10 illustrate examples of configuration pages 108 to render in the storage configuration GUI 112 to provision storage space for a user or system. FIG. 6 illustrates an embodiment of an initial configuration page $108_1$ in which the user may select one of four different user selectable storage spaces 602, 604, 606, 608, for 350 Terabytes (TB), 1 Petabyte (PB), 2 PB, 4 PB, respectively, for an initial configuration to provision in a storage system 116. The first user selectable storage space 602 comprises the physical storage, and the other user selectable storage spaces 604, 606, and 608 include virtual storage ranges comprising multiples of the physical storage. The graphic bar 610 provides a visual representation of the allocation commitment certainties of full, high, medium and low for different ranges of the user selectable storage spaces 602, 604, 606, and 608.

The full certainty comprises a storage range 614 of physical storage as present in all the user selectable storage spaces 602, 604, 606, 608. The high certainty comprises a virtual storage range 616 resulting from the application of a data reduction rate or compression ratio to expand the physical storage. The medium certainty comprises a virtual storage range 618 resulting from an expected growth in the data reduction rate. For instance, the data reduction rate may increase as the dictionary of existing chunks used for deduplication increases in the system. The low certainty corresponds to a virtual storage range 620 range that goes beyond the virtual storage ranges expected from application of data reduction rates due to compression and/or deduplication operations. The low certainty expresses that virtual storage range of the user selectable storage 608 that is unlikely to be available for allocation commitment when needed.

After selection of one of the user selectable storage spaces 602, 604, 606, 608, the user may select the apply button 622 to provision the selected storage space in the storage system 116 to the user.

Figure 7:
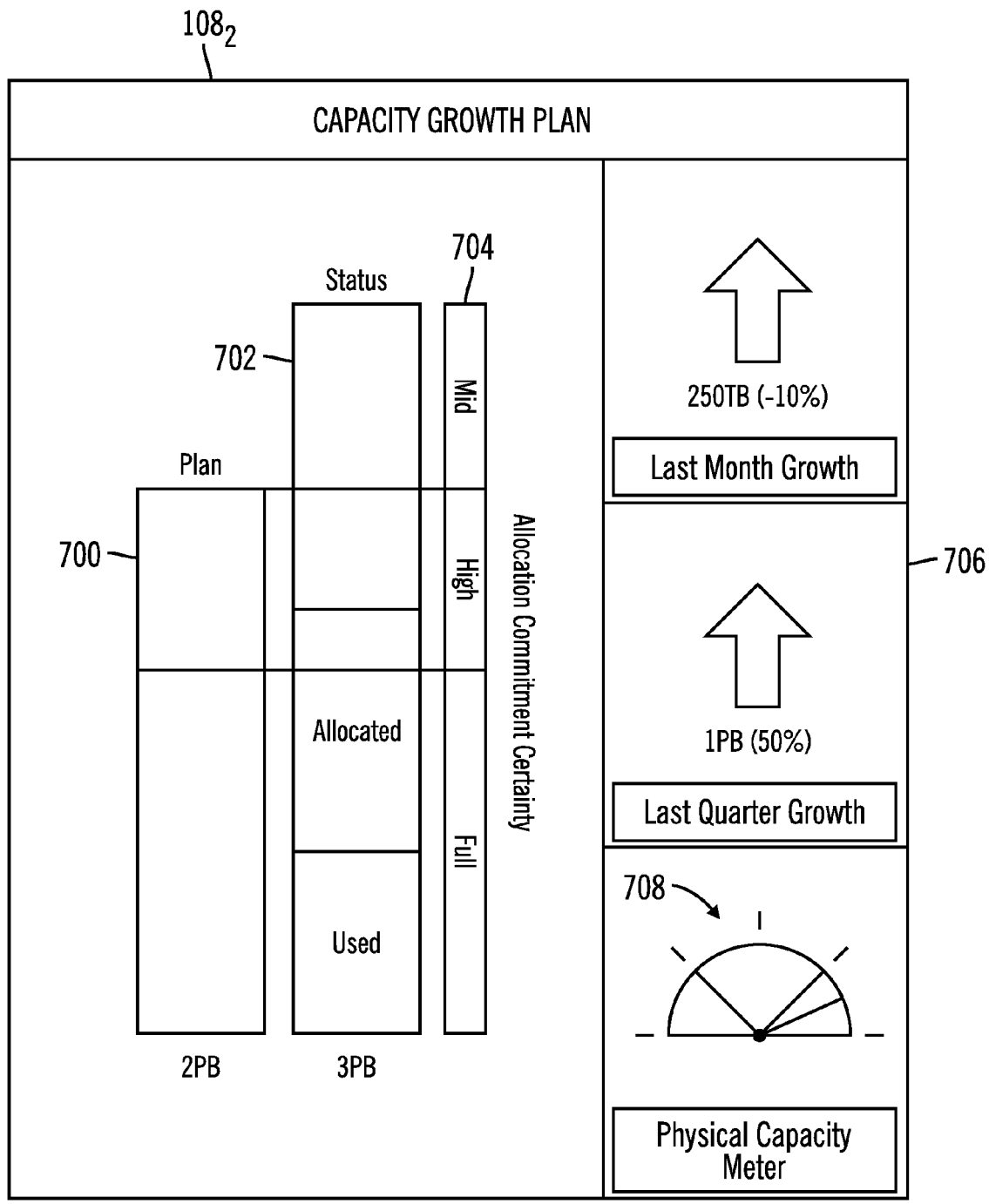

FIG. 7 illustrates an embodiment of a subsequent configuration page $108_2$ which displays information on changes to the virtual storage ranges of high and medium certainty resulting from changes in the data reduction rate during operations. The plan storage space 700 of 2 PB comprises the initial provisioned user selected storage space. A status storage space 702 shows how the storage space covered by the high and medium certainty virtual storage ranges has increased to 3 PB, a 50% increase over the initial plan 700. The virtual storage ranges for the high and medium certainty levels are visually represented in an allocation commitment certainty graphic 704. The status storage space 702 further shows the amount of storage space used and allocated for use. Panel 706 in the configuration page $108_2$ further shows that the increase in virtual storage space due to the greater virtual storage ranges corresponding to the high and medium certainties has increased for the quarter by 1 PB. Meter 708 illustrates an amount of available physical storage. Configuration page $108_2$ provides a visual representation of the extent to which the amount of virtual storage space having high and medium certainties has changed, where the change can be positive, as shown in configuration page $108_2$, or negative.

Figure 8:
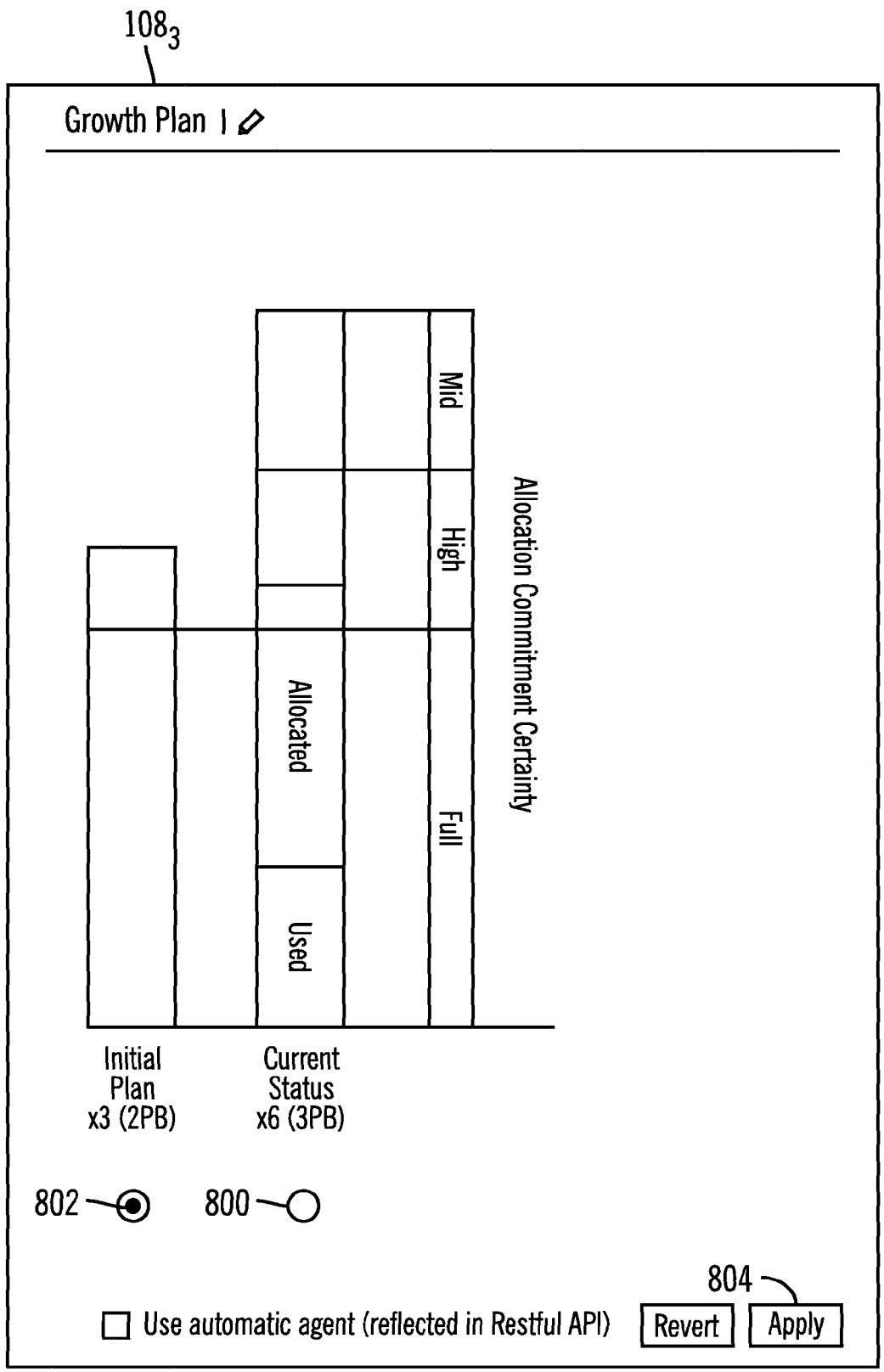

FIG. 8 illustrates an embodiment of a configuration page $108_3$ that presents revised user selectable storage spaces based on the changes to the allocation commitment certainties shown in configuration page $108_2$ in FIG. 7. The current status user selectable storage space 800 has virtual space falling within the ranges of the current high and medium allocation commitment certainties. The initial plan 802 initially selected is also shown. If the user selects the current status plan 800 and selects the apply button 804, then the user provisioned storage space would be adjusted to the new plan 800 having 3 PB, an increase over the initial plan.

Figure 9:
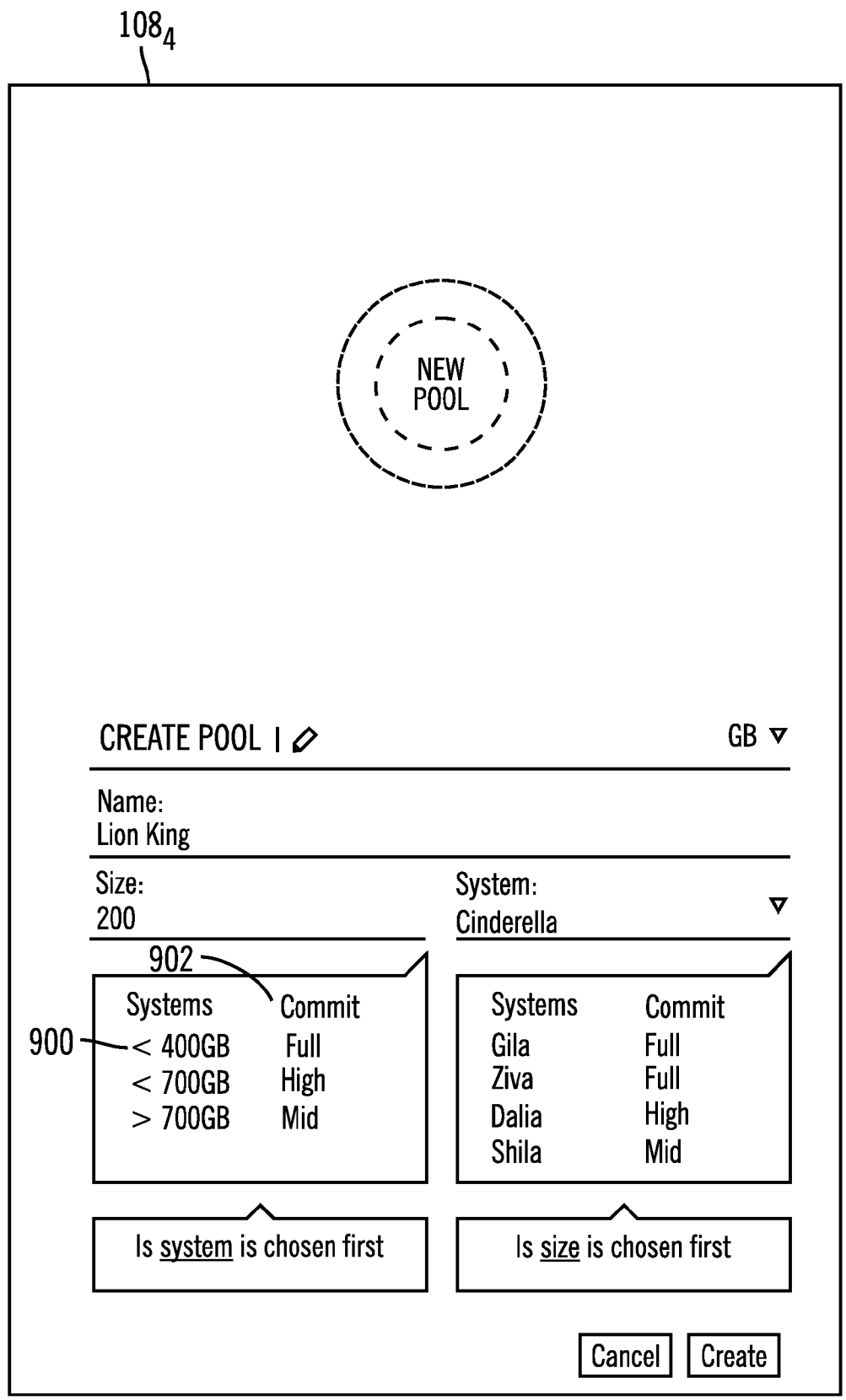

FIG. 9 illustrates an embodiment of a configuration page $108_4$ displayed for the user to select storage to add to a storage pool. The page $108_4$ shows different storage systems 116 that may be allocated to the pool, and includes for the systems the storage space 900 and the current certainty storage range 902, e.g., full, high, medium, low, from which storage is currently being allocated in the storage system.

Figure 10:
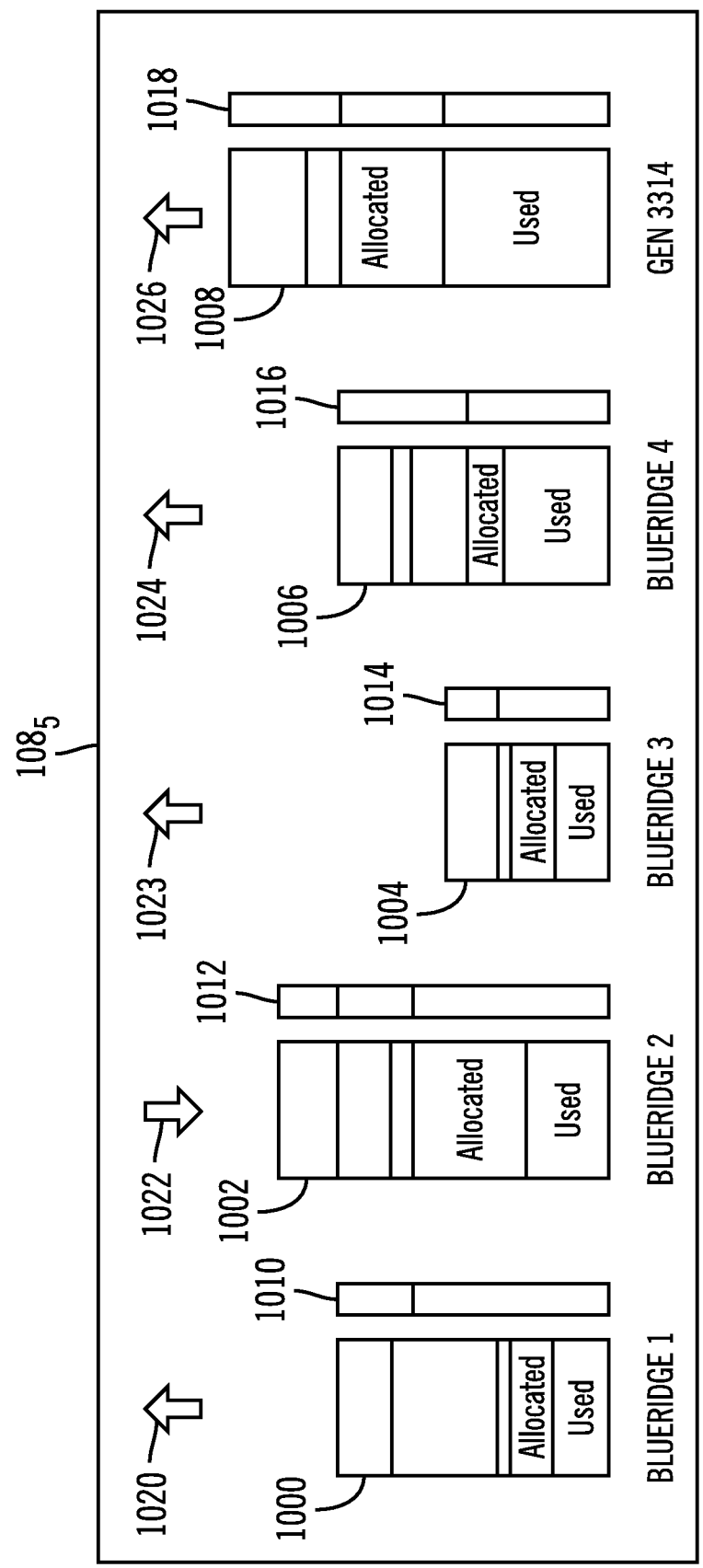

FIG. 10 illustrates an embodiment of a configuration page $108_5$ showing four storage systems 1000, 1002, 1004, 1006, 1008 including for each storage system an allocation commitment certainty graphic 1010, 1012, 1014, 1016, 1018 showing the full, high, and medium certainty ranges for each of the storage systems 1000, 1002, 1004, 1006, 1008. The arrows 1020, 1022, 1023, 1024 1026 above the rendered storage systems 1000, 1002, 1004, 1006, 1008, respectively, show the growth trend in the data reduction rate being experienced at the storage systems 1000, 1002, 1004, 1006, 1008, respectively. A user may use the information in FIG. 10 to select an appropriate storage system 1000, 1002, 1004, 1006, 1008 to use based on amount of physical space and virtual storage ranges having the high and medium certainties. The selected storage system 1000, 1002, 1004, 1006, 1008 may be used for a storage pool or other storage assignment.

Figure 11:
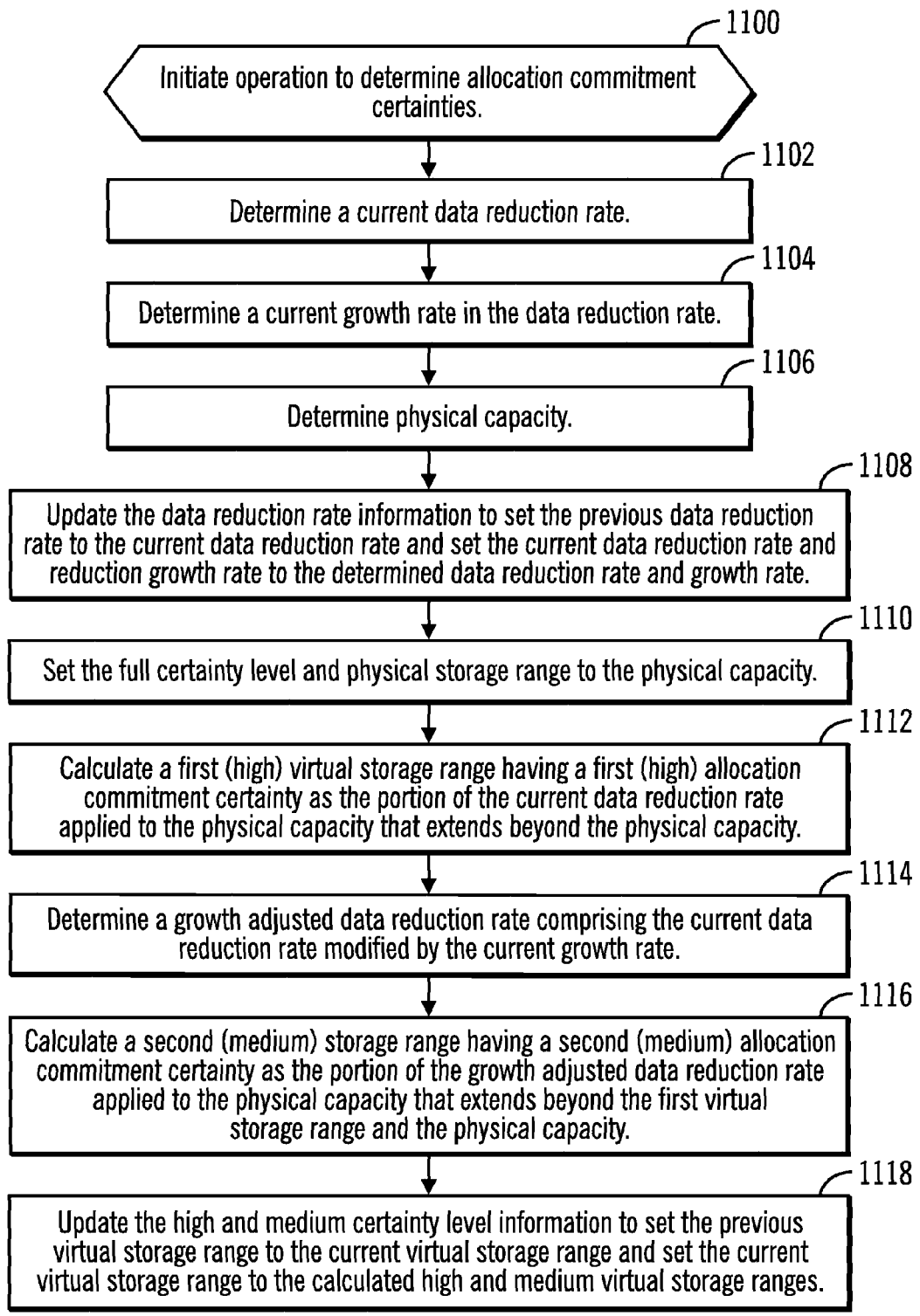
FIG. 11 illustrates an embodiment of operations to determine allocation commitment certainties for virtual storage ranges.

FIG. 11 illustrates an embodiment of operations performed by the storage configuration manager 106 to determine the allocation commitment certainties 300, during initial system configuration, such as in configuration page $108_1$ (FIG. 7) or as part of a later configuration page $108_2$, $108_4$, $108_5$ showing current experienced allocation commitment quantities 300 of a storage system 116. Upon initiating (at block 1100) the operations, the storage configuration manager 106 determines (at block 1102) a current reduction rate 206 and determines (at block 1104) a current reduction growth rate 208, which have been realized in the storage system 116 during current data reduction operations. The growth rate 208 may comprise the change in the data reduction rate from the previous data reduction rate 204 and the current data reduction rate 206. The storage configuration manager 106 may communicate with a deduplication manager to determine current data reduction rates, or obtain such information from logs or other sources. A physical capacity of the storage system 116 is also determined (at block 1106). The data reduction rate information 200, for the storage system 116 is updated (at block 1108) to set the previous data reduction rate 204 to the current data reduction rate 206 and set the current data reduction rate 206 and the reduction growth rate to the determined data reduction rate and growth rate. During the initial configuration such as in configuration page $108_1$ (FIG. 6), the current data reduction rate 206 and growth rate 208 may comprise default benchmark values for the deduplication and/or compression programs that are performing data reduction operations. After the initial configuration, the current data reduction rate 206 and reduction growth rate 208 may comprise measured rates based on actual experienced deduplication and compression operations.

A full certainty level and the physical storage range is set (at block 1110) to the physical storage capacity of the storage system 116, where the physical storage range extends from zero to the size of the physical storage, e.g., range 614 in FIG. 6. The storage configuration manager 106 calculates (at block 1112) a first high virtual storage range 616 having a first high allocation commitment certainty as the portion 616 of the current data reduction rate 206 applied to the physical capacity that extends beyond the physical capacity 614. The first storage range may comprise a range having a length of the product of the current data reduction rate and the physical capacity less the physical capacity.

Figure 4:
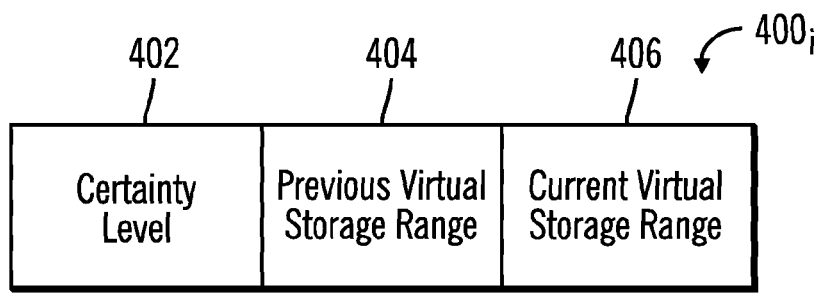
FIG. 4 illustrates an embodiment of certainty level information maintained for a certainty level.

The storage configuration manager 106 determines (at block 1114) a growth adjusted data reduction rate comprising the current data reduction rate modified by the current growth rate. A second (medium) storage range for the medium allocation commitment certainty may be calculated (at block 1116) as the portion 618 of the growth adjusted data reduction rate applied to the physical capacity that extends beyond the first virtual storage range 616 and the physical capacity 614. The high 400₁ and medium 400₂ (FIG. 4) certainty level information instances are updated (at block 1118) to set the previous virtual storage range 404 to the current virtual storage range 406 and set the current virtual storage range 406 to the calculated high and medium virtual storage ranges. In this way, information on previous virtual storage ranges and current virtual storage ranges are maintained to allow comparisons of how the data reduction rate has changed and its impact on the commitment certainty of virtual storage ranges.

Figure 12:
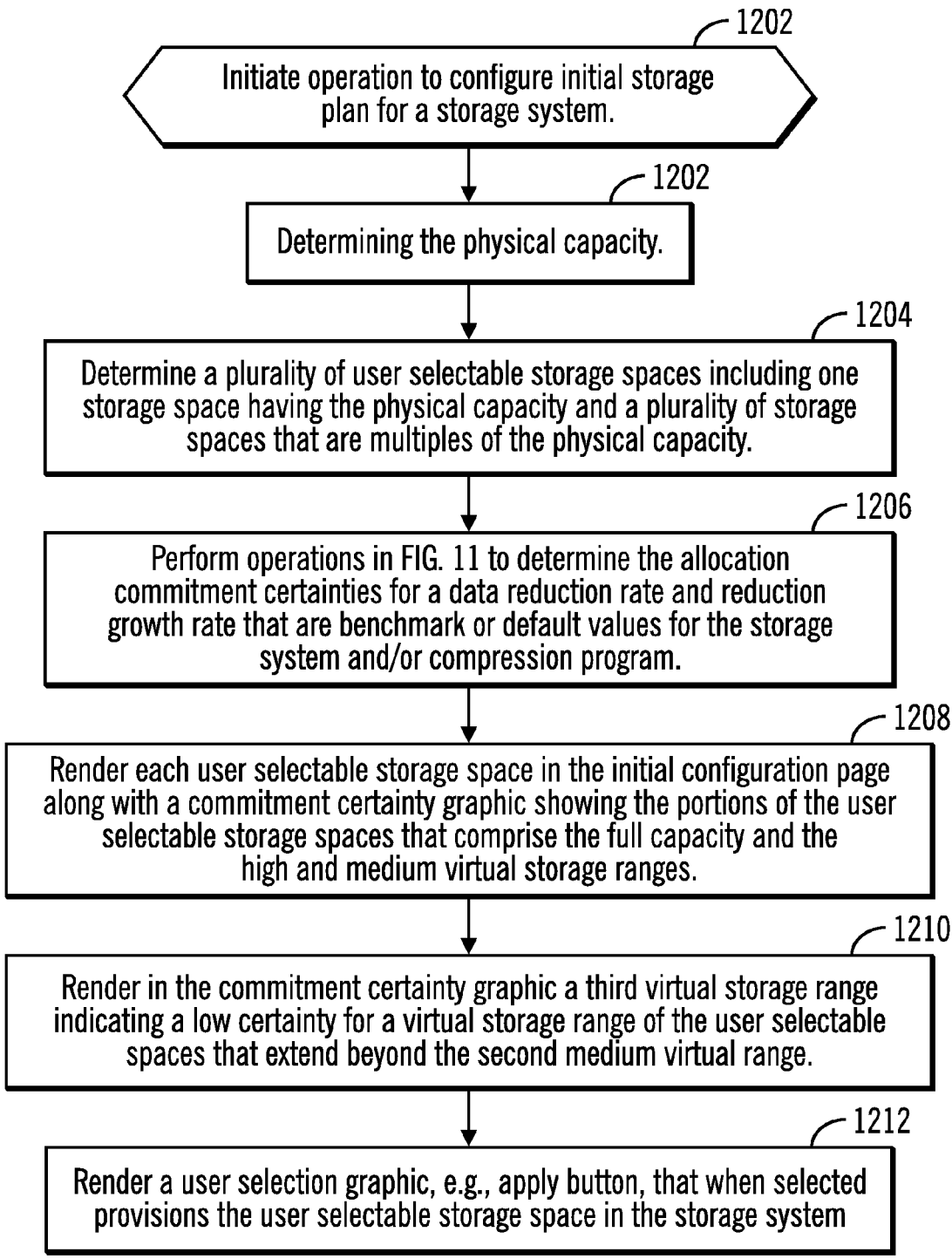
FIG. 12 illustrates an embodiment of operations to generate allocation commitment certainties for an initial storage configuration plan.

FIG. 12 illustrates an embodiment of operations performed by the storage configuration manager 106 to generate the initial configuration page 108₁ as shown in FIG. 6. Upon initiating (at block 1200) operations for the initial provisioning of a storage system 116, the physical capacity of the storage system 116 is determined (at block 1202). The storage configuration manager 106 determines (at block 1204) a plurality of user selectable storage spaces 602, 604, 606, 608 (FIG. 6), including one storage space 602 having the physical capacity and a plurality of storage spaces 604, 606, 608 having virtual storage space that are multiples of the physical capacity, e.g., three times, six times, and twelve times, as shown in FIG. 6. The storage configuration manager 106 performs (at block 1206) the operations in FIG. 11 to determine the allocation commitment certainties 200ᵢ, for a data reduction rate and reduction growth rate that are benchmark or default values for the compression program performing the compression and/or deduplication for the storage system 116 to provision.

Each user selectable storage space is rendered (at block 1208) in the configuration page 108₁ along with a commitment certainty graphic 610 (FIG. 6) showing the portions of the user selectable storage spaces that comprise the full capacity storage range 614, the high certainty virtual storage range 616, and the medium certainty virtual storage range 618. A third virtual storage range 618 indicating a low allocation commitment certainty is rendered (at block 1210) in the allocation commitment certainty graphic 610 for the virtual storage range 620 that extends beyond the medium virtual storage range 618, and has a low likelihood of being available when needed for allocation. A user selection graphic, e.g., apply button 622, is rendered in the configuration page 108₁ that when selected by the user provisions the user selected storage space 602, 604, 606, 608 for the user from the storage system 116

With the operations of FIG. 12, a configuration page 108₁ is rendered that provides the user different options for a storage space configuration which shows the portions of the storage space that are virtual storage space extending beyond actual physical storage and also shows a certainty level for virtual storage ranges in the user selectable storage spaces to allow the user to be made aware of the likelihood that different storage ranges will be available for use. For instance, page 108₁ makes the user visually aware that a significant portion of the 4PB user selectable storage space 608 having a low certainty level will unlikely be available for allocation commitments when needed. The other user selectable storage spaces 604, 606 have virtual storage ranges having medium and high certainty levels and are more likely to be available when needed.

Figure 13:
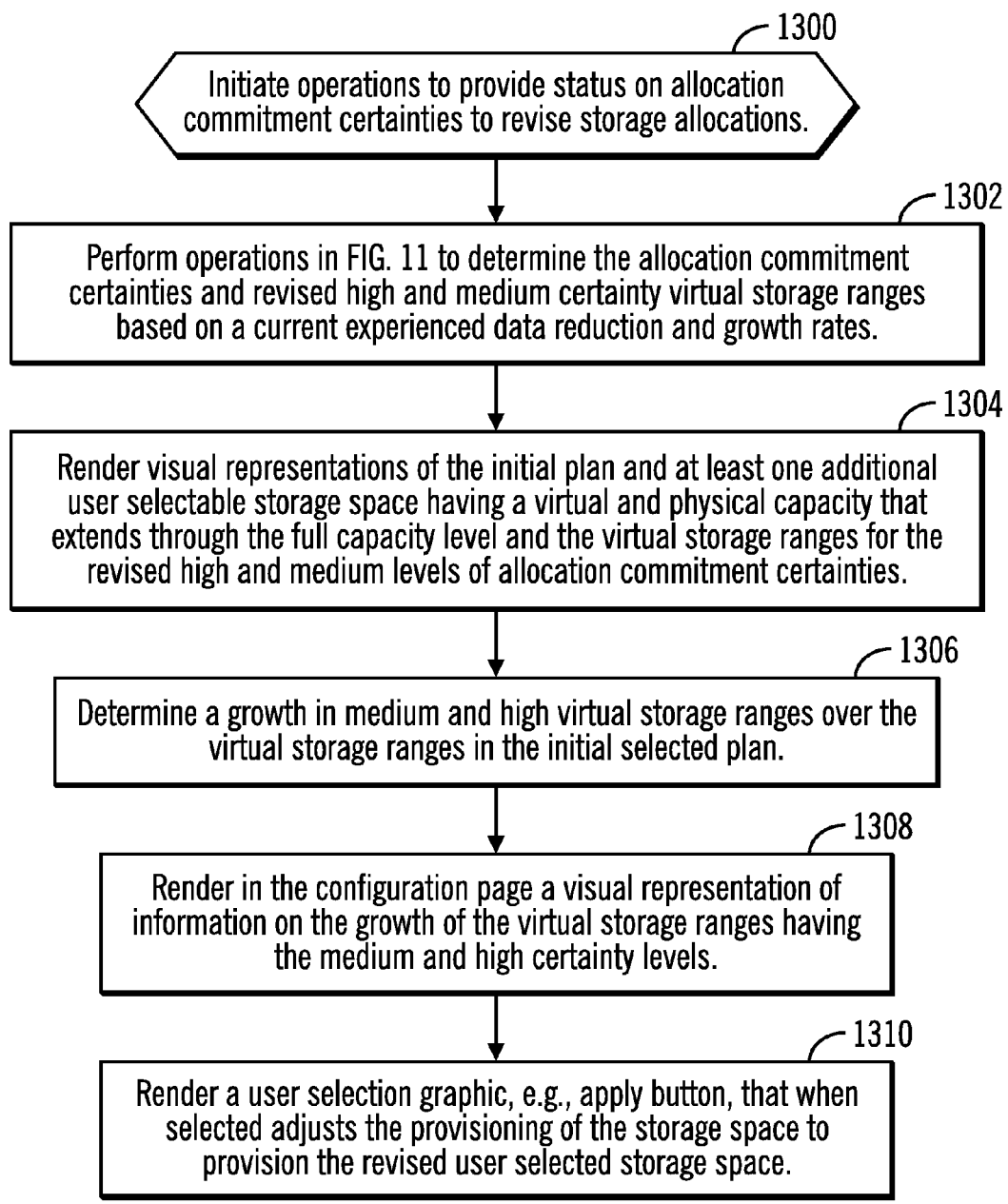
FIG. 13 illustrates an embodiment of operations to generate allocation commitment certainties for a revised storage configuration plan.

FIG. 13 illustrate an embodiment of operations performed by the storage configuration manager 106 to generate the configuration page 108₂ to use to revise a storage allocation as shown in FIG. 7. Upon initiating (at block 1300) operations for revising the configuration of a storage system 116 having space previously provisioned, the storage configuration manager 106 performs (at block 1302) the operations in FIG. 11 to determine the allocation commitment certainties 300, and corresponding virtual ranges for a current data reduction rate and reduction growth rate that have been realized in the storage system 116 since the initial provisioning.

The storage configuration manager 106 renders (at block 1304) visual representations of the initial selected plan 700 and at least one additional user selectable storage space 702 having a virtual storage portions that extend through the revised virtual storage ranges for the high and medium allocation commitment certainties, shown in the allocation commitment certainty graphic 704.

A determination is made (at bock 1306) of a growth in the medium and high virtual storage ranges over the virtual storage ranges in the initial selected plan. The configuration storage manager 106 may render (at block 1308) in the configuration page 108₂ a panel 706 providing a visual representation of information on the growth of the virtual storage ranges having the medium and high certainty levels. A user selection graphic, e.g., apply button 804, is rendered (at block 1310) that when selected adjusts the provisioning of the storage space to provision the revised user selected storage space in the storage system 116.

With the operations of FIG. 13, a configuration page 108₂ is rendered that provides the user information on the current allocation commitment certainties by showing the current medium and high virtual storage ranges of the initial plan 700 storage space the user is using and a potential new, or status, plan 702 having virtual storage that extends through the medium and high certainty virtual storage ranges. This shows the user the extent to which the storage space may be adjusted (upward or downward) by showing the current virtual storage ranges having a medium and high certainty levels, so the user may determine whether to adjust their provisioned storage space to have a size commensurate with the current virtual storage ranges determined based on current data reduction rates being experienced in the storage system 116.

Figure 14:
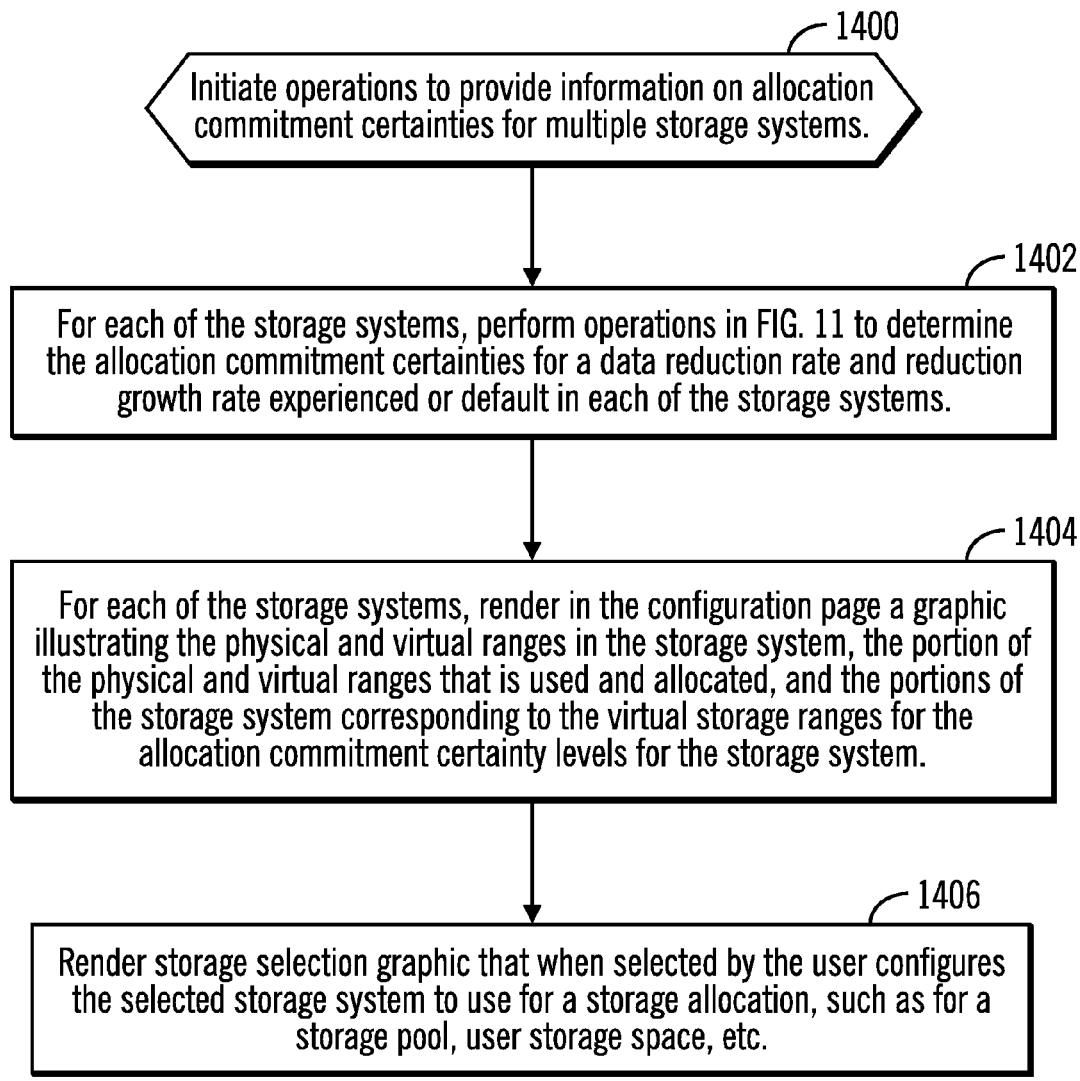
FIG. 14 illustrates an embodiment of operations to generate allocation commitment certainties for multiple storage systems.

FIG. 14 illustrates an embodiment of operations performed by the storage configuration manager 106 to provide the user information on the allocation commitment certainties for multiple storage systems 116, such as shown in the configuration pages $108_4$ (FIG. 9) and $108_5$ (FIG. 10), which may be used to determine storage systems 116 to select for storage pool or other configurations. Upon initiating (at block 1400) operations to provide allocation commitment certainties for the storage systems 116, the storage configuration manager 106 performs (at block 1402) the operations in FIG. 11 for each of the storage systems 116 to determine the allocation commitment certainties for a data reduction rate and reduction growth rate experienced or default in each of the storage systems. For each of the storage systems 116 being considered, the storage configuration manager 106 renders (at block 1404) in the configuration page $108_5$ a graphic illustrating the physical and virtual ranges in the storage system, the portion of the physical and virtual ranges that is used and allocated, and the portions of the storage system corresponding to the virtual storage ranges for the allocation commitment certainty levels for the storage system. FIG. 10 shows the visual representations for each of the storage systems 1000, 1002, 1004, 1006, 1008 and the visual representation of the allocation commitment certainty levels 1010, 1012, 1014, 1016, 1018 and the corresponding virtual storage ranges. FIGS. 9 and 10 show the visual presentations for storage systems and the current allocation certainty level and corresponding virtual storage range from which storage is currently being allocated.

A storage selection graphic is rendered (at block 1406) in the configuration page 108 that when selected by the user configures the selected storage system to use for a storage allocation, such as for a storage pool, user storage space, etc.

Described embodiments provide techniques to generate and present information on allocation commitment certainties for virtual storage ranges in a storage system that are determined by a data reduction rate and reduction growth rate experienced during data reduction operations at the storage system. The allocation commitment certainties for different virtual storage ranges that could be configured in a storage system may be considered when determining an initial storage configuration for a storage space and when determining whether the provisioning of the virtual storage should be increased or decreased based on experienced levels of data reduction, e.g., deduplication and compression.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

Figure 15:
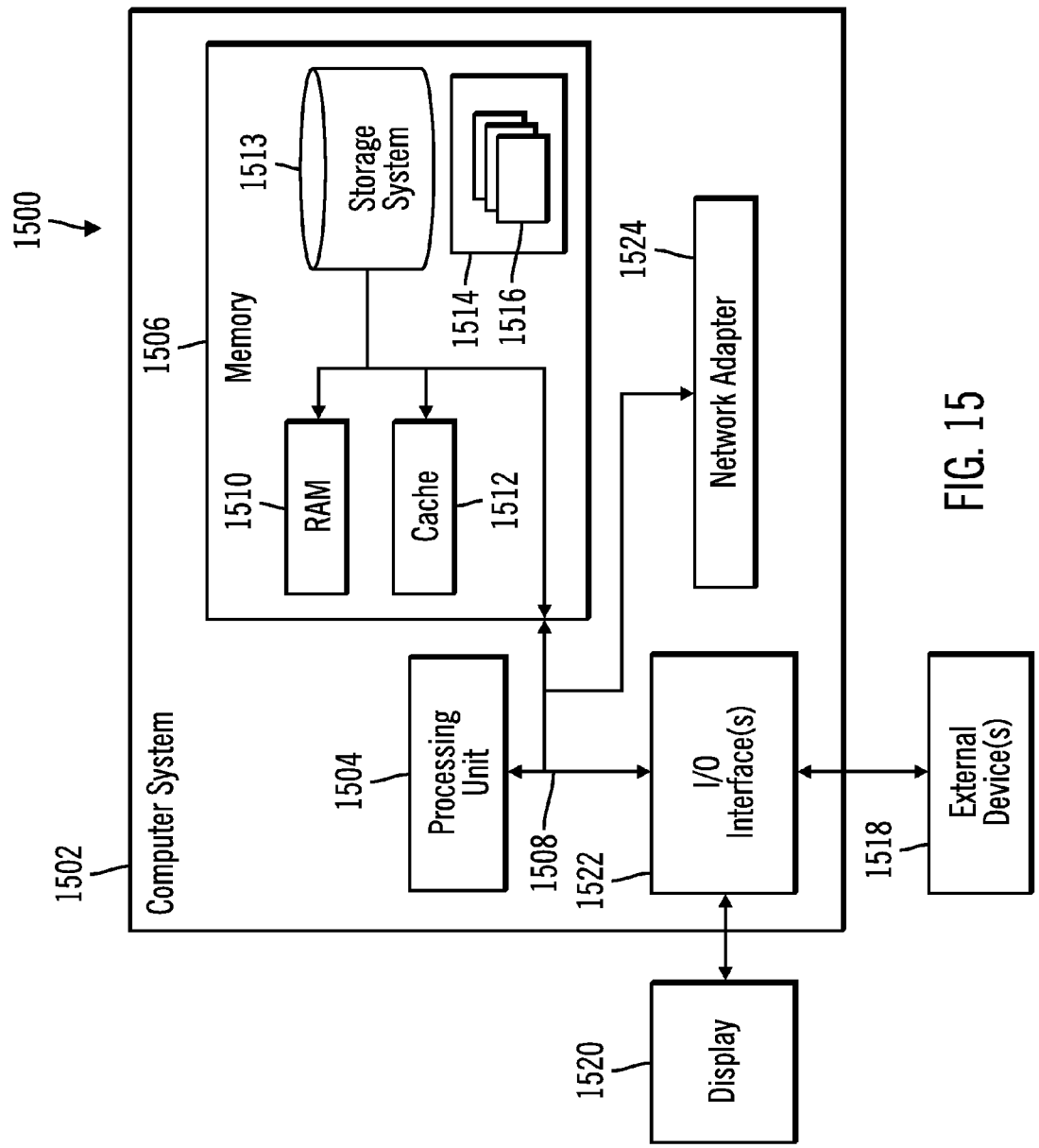
FIG. 15 illustrates a computing environment in which the components of FIG. 1 may be implemented.

The configuration server 100, client 114, and storage system 116 of FIG. 1 may be implemented in one or more computer systems, such as the computer system 1502 shown in FIG. 15. Computer system/server 1502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, the computer system/server 1502 is shown in the form of a general-purpose computing device. The components of computer system/server 1502 may include, but are not limited to, one or more processors or processing units 1504, a system memory 1506, and a bus 1508 that couples various system components including system memory 1506 to processor 1504. Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of embodiments of the invention.

Program/utility 1514, having a set (at least one) of program modules 1516, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. The components of the computer 1502 may be implemented as program modules 1516 which generally carry out the functions and/or methodologies of embodiments of the invention as described herein. The systems of FIG. 1 may be implemented in one or more computer systems 1502, where if they are implemented in multiple computer systems 1502, then the computer systems may communicate over a network.

Computer system/server 1502 may also communicate with one or more external devices 1518 such as a keyboard, a pointing device, a display 1520, etc.; one or more devices that enable a user to interact with computer system/server 1502; and/or any devices (e.g., network card, modem, etc.) that enable computer system/server 1502 to communicate with one or more other computing devices. Such communication can occur via Input/Output (I/O) interfaces 1522. Still yet, computer system/server 1502 can communicate with one or more networks such as a local area network (LAN), a general wide area network (WAN), and/or a public network (e.g., the Internet) via network adapter 1524. As depicted, network adapter 1524 communicates with the other components of computer system/server 1502 via bus 1508. It should be understood that although not shown, other hardware and/or software components may be used in conjunction with computer system/server 1502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating a configuration page for rendering in a graphical user interface (GUI) for managing provisioning of storage resources in a storage system, the computer program product comprising a computer readable storage medium having computer readable program code embodied therein that executes to perform operations, the operations comprising:
    determining allocation commitment certainties for virtual storage ranges to allocate from the storage system based on a physical capacity in the storage system and an estimated data reduction rate, wherein each of the allocation commitment certainties indicates a likelihood that a corresponding of the virtual storage ranges will be available for allocation beyond the physical capacity of the storage system;
    rendering in the configuration page a visual representation of a plurality of user selectable storage spaces indicating the allocation commitment certainties for the virtual storage ranges in the user selectable storage spaces, wherein at least one of the user selectable storage spaces includes the virtual storage ranges; and
    rendering in the configuration page a user selection graphic that when selected provisions a selected of the user selectable storage spaces in the storage system.

2. The computer program product of claim 1, wherein the determining the allocation commitment certainties are performed for a plurality of storage systems to determine the virtual storage ranges for each of the plurality of the storage systems, wherein visual representations of the user selectable storage spaces rendered in the configuration page comprise the plurality of the storage systems rendered with indication of used and allocated space in the storage systems, and indication of the allocation commitment certainties and corresponding virtual storage ranges in the storage systems.

3. The computer program product of claim 1, wherein the virtual storage ranges include a first virtual storage range and second virtual storage range for a first level and second level of additional levels of allocation commitment certainties,
    wherein the first virtual storage range comprises the estimated data reduction rate applied to the physical capacity that extends beyond the physical capacity, and
    wherein the second virtual storage range comprises a growth adjusted data reduction rate comprising an estimated reduction rate adjusted by an estimated growth rate for the data reduction rate applied to the physical capacity that extends beyond the physical capacity and the first virtual storage range.

4. The computer program product of claim 3, wherein the virtual storage ranges include a third virtual storage range comprising a range beyond the first and second virtual storage ranges for the user selectable storage spaces having a third certainty level indicating an allocation commitment certainty having a greatest degree of uncertainty.

5. The computer program product of claim 1, wherein the estimated data reduction rate comprises a ratio at which deduplication will reduce data storage space needed for a data unit.

6. The computer program product of claim 1, wherein the estimated data reduction rate comprises an initial data reduction rate, wherein the operations further comprise:
    determining a current data reduction rate changed from the initial data reduction rate due to data storage operations at a provisioned user selected storage space based;
    determining revised allocation commitment certainties for revised virtual storage ranges based on the physical capacity and the current data reduction rate;
    rendering in the configuration page a plurality of revised user selectable storage spaces indicating the revised allocation commitment certainties for the revised virtual storage ranges in the revised user selectable storage spaces; and
    rendering in the configuration page a user selection graphic that when selected adjusts the provisioning of the provisioned user selected storage space to provision a selected of the revised user selectable storage spaces in the storage system.

7. The computer program product of claim 6, wherein the estimated data reduction rate is based on a predetermined data reduction rate specified for deduplication operations before the storage system is provisioned and wherein the current data reduction rate comprises a realized data reduction rate resulting from deduplication and compression operations at the provisioned user selected storage space.

8. The computer program product of claim 6, wherein the provisioning the user selected storage space prior to the adjusting the provisioning is part of an initial setup of storage space for a user, and wherein the provisioned user selected storage space comprises an initial plan, wherein the rendering the plurality of revised user selectable storage spaces in the configuration page comprises:
rendering the initial plan shown as selected; and
rendering at least one additional revised user selectable storage spaces different from the initial plan, wherein the adjusting the provisioning of the provisioned user selected storage space is performed in response to receiving user selection of one of the revised user selectable storage spaces other than the initial plan.

9. The computer program product of claim 6, wherein the revised virtual storage ranges include a first revised virtual storage range and a second revised virtual storage range for first and second allocation commitment certainties, respectively,
wherein the first revised virtual storage range comprises the current data reduction rate applied to the physical capacity that extends beyond the physical capacity, and
wherein the second revised virtual storage range comprises a revised growth adjusted data reduction rate comprising the current data reduction rate adjusted by a current growth rate of the current data reduction rate applied to the physical capacity that extends beyond the physical capacity and the first revised virtual storage range.

10. The computer program product of claim 9, wherein the operations further comprise:
determining a growth in an amount of the first revised virtual storage range over the physical capacity and the first virtual storage range at an initial plan; and
rendering information on the determined growth in the first revised virtual storage range having the first allocation commitment certainty.

11. A system for generating a configuration page for rendering in a graphical user interface (GUI) for managing provisioning of storage resources in a storage system, comprising:
a processor; and
a computer readable storage medium including program code that in response to being executed by the processor causes operations to be performed, the operations comprising:
determining allocation commitment certainties for virtual storage ranges to allocate from the storage system based on a physical capacity in the storage system and an estimated data reduction rate, wherein each of the allocation commitment certainties indicates a likelihood that a corresponding of the virtual storage ranges will be available for allocation beyond the physical capacity of the storage system;
rendering in the configuration page a visual representation of a plurality of user selectable storage spaces indicating the allocation commitment certainties for the virtual storage ranges in the user selectable storage spaces, wherein at least one of the user selectable storage spaces includes the virtual storage ranges; and
rendering in the configuration page a user selection graphic that when selected provisions a selected of the user selectable storage spaces in the storage system.

12. The system of claim 11, wherein the virtual storage ranges include a first virtual storage range and second virtual storage range for a first level and second level of additional levels of allocation commitment certainties,
wherein the first virtual storage range comprises the estimated data reduction rate applied to the physical capacity that extends beyond the physical capacity, and
wherein the second virtual storage range comprises a growth adjusted data reduction rate comprising an estimated reduction rate adjusted by an estimated growth rate for the data reduction rate applied to the physical capacity that extends beyond the physical capacity and the first virtual storage range.

13. The system of claim 12, wherein the virtual storage ranges include a third virtual storage range comprising a range beyond the first and second virtual storage ranges for the user selectable storage spaces having a third certainty level indicating an allocation commitment certainty having a greatest degree of uncertainty.

14. The system of claim 11, wherein the estimated data reduction rate comprises an initial data reduction rate, wherein the operations further comprise:
determining a current data reduction rate changed from the initial data reduction rate due to data storage operations at a provisioned user selected storage space based;
determining revised allocation commitment certainties for revised virtual storage ranges based on the physical capacity and the current data reduction rate;
rendering in the configuration page a plurality of revised user selectable storage spaces indicating the revised allocation commitment certainties for the revised virtual storage ranges in the revised user selectable storage spaces; and
rendering in the configuration page a user selection graphic that when selected adjusts the provisioning of the provisioned user selected storage space to provision a selected of the revised user selectable storage spaces in the storage system.

15. The system of claim 14, wherein the provisioning the user selected storage space prior to the adjusting the provisioning is part of an initial setup of storage space for a user, and wherein the provisioned user selected storage space comprises an initial plan, wherein the rendering the plurality of revised user selectable storage spaces in the configuration page comprises:
rendering the initial plan shown as selected; and
rendering at least one additional revised user selectable storage spaces different from the initial plan, wherein the adjusting the provisioning of the provisioned user selected storage space is performed in response to receiving user selection of one of the revised user selectable storage spaces other than the initial plan.

16. A method for generating a configuration page for rendering in a graphical user interface (GUI) for managing provisioning of storage resources in a storage system, comprising:
determining allocation commitment certainties for virtual storage ranges to allocate from the storage system based on a physical capacity in the storage system and an estimated data reduction rate, wherein each of the allocation commitment certainties indicates a likelihood that a corresponding of the virtual storage ranges will be available for allocation beyond the physical capacity of the storage system; and
rendering in the configuration page a visual representation of a plurality of user selectable storage spaces indicating the allocation commitment certainties for the virtual storage ranges in the user selectable storage spaces, wherein at least one of the user selectable storage spaces includes the virtual storage ranges; and rendering in the configuration page a user selection graphic that when selected provisions a selected of the user selectable storage spaces in the storage system.

17. The method of claim 16, wherein the virtual storage ranges include a first virtual storage range and second virtual storage range for a first level and second level of additional levels of allocation commitment certainties, wherein the first virtual storage range comprises the estimated data reduction rate applied to the physical capacity that extends beyond the physical capacity, and wherein the second virtual storage range comprises a growth adjusted data reduction rate comprising an estimated reduction rate adjusted by an estimated growth rate for the data reduction rate applied to the physical capacity that extends beyond the physical capacity and the first virtual storage range.

18. The method of claim 17, wherein the virtual storage ranges include a third virtual storage range comprising a range beyond the first and second virtual storage ranges for the user selectable storage spaces having a third certainty level indicating an allocation commitment certainty having a greatest degree of uncertainty.

19. The method of claim 16, wherein the estimated data reduction rate comprises an initial data reduction rate, further comprising:

determining a current data reduction rate changed from the initial data reduction rate due to data storage operations at a provisioned user selected storage space based;

determining revised allocation commitment certainties for revised virtual storage ranges based on the physical capacity and the current data reduction rate;

rendering in the configuration page a plurality of revised user selectable storage spaces indicating the revised allocation commitment certainties for the revised virtual storage ranges in the revised user selectable storage spaces; and rendering in the configuration page a user selection graphic that when selected adjusts the provisioning of the provisioned user selected storage space to provision a selected of the revised user selectable storage spaces in the storage system.

20. The method of claim 19, wherein the provisioning the user selected storage space prior to the adjusting the provisioning is part of an initial setup of storage space for a user, and wherein the provisioned user selected storage space comprises an initial plan, wherein the rendering the plurality of revised user selectable storage spaces in the configuration page comprises:

rendering the initial plan shown as selected; and rendering at least one additional revised user selectable storage spaces different from the initial plan, wherein the adjusting the provisioning of the provisioned user selected storage space is performed in response to receiving user selection of one of the revised user selectable storage spaces other than the initial plan.

* * * * *